United States Patent
Salzer

(10) Patent No.: US 7,336,636 B2
(45) Date of Patent: Feb. 26, 2008

(54) MC-CDMA DOWNLINK TRANSMISSION METHOD

(75) Inventor: Thomas Salzer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 777 days.

(21) Appl. No.: 10/623,523

(22) Filed: Jul. 22, 2003

(65) Prior Publication Data

US 2005/0030925 A1 Feb. 10, 2005

(30) Foreign Application Priority Data

Sep. 5, 2002 (EP) .................................. 02292189

(51) Int. Cl.
*H04B 7/216* (2006.01)
(52) U.S. Cl. ....................... 370/335; 370/320; 370/337; 370/342; 370/344
(58) Field of Classification Search ................ 370/335, 370/320, 337, 342, 344
See application file for complete search history.

(56) References Cited

U.S. PATENT DOCUMENTS

2001/0028637 A1* 10/2001 Abeta et al. ................ 370/335

OTHER PUBLICATIONS

Dong Geun Jeong, et al., "Effects of Channel Estimation Error in MC-CDMA/TDD Systems", IEEE, Vehicular Technology Conference Proceedings, Tokyo, Japan, May 15-18, 2000, pp. 1773-1777.
Zhiyong Pu, et al., "Transmission and Reception of TDD Multicarrier CDMA Signals in Mobile Communications System", 1999 IEEE, Vehicular Technology Conference, May 16, 1999, pp. 2134-2138.
Incheol Jeong, et al., "A TDD-CDMA System With Pre-Phase Subcarrier Equalizer Using Asymmetric Modulation Scheme in Duplex Channel", 1999 IEEE. Global Telecommunications Conference—Globecom'99, General Conference (Part A), Dec. 5-9, 1999, pp. 122-126.
Seyed A. Zekavat, et al., "The Merger of a Single Oscillating-Beam Smart Antenna and MC-CDMA: Transmit Diversity, Frequency Diversity and Directionality", 2001 IEEE, Proceedings of IEEE Emerging Technologies Symposium on Broadband Communications for Internet era, Sep. 2001, pp. 107-112.

* cited by examiner

*Primary Examiner*—Duc M. Nguyen
*Assistant Examiner*—Wayne Cai
(74) *Attorney, Agent, or Firm*—Oblon, Spivak, McClelland, Maier & Neustadt, P.C.

(57) ABSTRACT

The invention concerns a transmission method for transmitting a plurality of symbols from a base station of a MC-CDMA telecommunication system to a plurality (K) of users, each symbol ($d_k$) to be transmitted to a user being spread with a coding sequence ($c_k(l)$, $c_k^{ext}(l)$) over a plurality (L) of carriers (l) to produce a plurality of corresponding frequency component, said base station being provided with a plurality (M) of antenna elements. According to the invention, each frequency component produced by a symbol of a user (k) is weighted by a plurality (M) of weighting complex coefficients ($w_k^*(l,m), m=1, \ldots, M$) to obtain a plurality (LM) of weighted frequency components ($z_k^m(l)$), each weighting coefficient being relative to a user (k), a carrier (l) and an antenna element (m) and said plurality of weighting coefficients being determined from estimates of the channel coefficients ($h_k(l,m)$) of the downlink transmission channels between each antenna element and each user for each carrier frequency.

9 Claims, 5 Drawing Sheets

MC-CDMA DOWNLINK TRANSMISSION METHOD

BACKGROUND OF THE INVENTION

1. Field of the Invention

The present invention concerns a method of transmission from a base station of a MC-CDMA telecommunication system to a plurality of users thereof

2. Description of the Related Art

MC-CDMA has been receiving widespread interest for wireless broadband multimedia applications. Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike DS-CDMA (Direct Spread Code Division Multiple Access), in which the signal of each user is multiplied in the time domain in order to spread its frequency spectrum, the signature here multiplies the signal in the frequency domain, each element of the signature multiplying the signal of a different sub-carrier.

In general, MC-CDMA combines the advantageous features of CDMA and OFDM, i.e. high spectral efficiency, multiple access capabilities, robustness in presence of frequency selective channels, high flexibility, narrow-band interference rejection, simple one-tap equalisation, etc.

FIG. 1 illustrates schematically the structure of a MC-CDMA transmitter transmitting a plurality of MC-CDMA symbols to a plurality K of users. For example, we suppose that the transmitter is located in a base station of a MC-CDMA transmission system and transmits MC-CDMA symbols to a plurality of users over a plurality of downlink transmission channels.

Let $d_k(n)$ be a complex symbol to be transmitted from the base station to user k at time nT, where $d_k(n)$ belongs to the modulation alphabet and let denote $\sqrt{Pt_k}$ the transmission amplitude coefficient relative to this symbol, where $Pt_k$ is the power of transmission associated to user k during the transmission frame to which $d_k(n)$ belongs. The complex value $\sqrt{Pt_k} \cdot d_k(n)$ is first multiplied at multiplier $110_k$ by a spreading sequence denoted $c_k(l)$. The spreading sequence consists of N "chips", each "chip" being of duration $T_c$, the total duration of the spreading sequence corresponding to a symbol period T. We assume otherwise specified in the following that a single spreading sequence is allocated for the transmission to a user. In general, however, a plurality of orthogonal spreading sequences (multi-code allocation) can be allocated to a given user according to the data rate required. In order to mitigate intra-cell interference, the spreading sequences are chosen orthogonal.

The result of the multiplication of the complex value $\sqrt{Pt_k} \cdot d_k(n)$, hereinafter simply denoted $\sqrt{Pt_k} \cdot d_k$, by the elements of the spreading sequence for user k gives N complex values demultiplexed in demultiplexer $120_k$ over a subset of N frequencies of an OFDM multiplex. In general, the number N of frequencies of said subset is a sub-multiple of the number L of frequencies of the OFDM multiplex. We assume in the following that L=N and denote $c_k(l)=c_k(lT_c)$, l=1, . . . ,L the values of the spreading sequence elements for user k. The block of complex values demultiplexed in $120_k$ is then subjected to an inverse fast Fourier transformation (IFFT) in the module $130_k$. In order to prevent intersymbol interference, a guard interval of length typically greater than the duration of the impulse response of the transmission channel, is added to the MC-CDMA symbol. This is achieved in practice by adding a prefix (denoted Δ) identical to the end of the said symbol. After being serialised in the parallel to serial converter $140_k$ and converted into an analogue signal (conversion not shown) the MC-CDMA symbol $S_k$ to be sent to user k is added in adder 150 to the similar MC-CDMA symbols $S_{k'}$ to be transmitted to the other users k'≠k. The resulting sum S is then filtered and RF frequency up-converted (not shown) before being transmitted by the base station. The MC-CDMA method can essentially be regarded as a spreading in the spectral domain (before IFFT) followed by an OFDM modulation.

The signal $S_k$ at time t which is supplied to the adder 150 before being transmitted over the downlink transmission channel can therefore be written, if we omit the prefix:

$$S_k(t) = d_k \cdot \sqrt{Pt_k} \cdot \sum_{l=1}^{L} c_k(l) \exp(j \cdot 2\pi f_l t) \text{ for } nT \le t < (n+1)T \quad (1)$$

where $f_l=((l-1)-L/2)/T$, l=1, . . . ,L are the frequencies of the OFDM multiplex. More precisely, it should be understood that the transmitted signal is in fact $Re(S_k(t)\exp(j2\pi F_0 t))$ where Re(.) stands for the real part and $F_0$ is the RF carrier frequency. In other words, $S_k(t)$ is the complex envelope of the transmitted signal.

The resulting sum signal S can be written at time t:

$$S(t) = \sum_{k=1}^{K} d_k \cdot \sqrt{Pt_k} \cdot \sum_{l=1}^{L} c_k(l) \exp(j \cdot 2\pi f_l t) \text{ for } nT \le t < (n+1)T \quad (2)$$

A MC-CDMA receiver for a given user g has been illustrated schematically in FIG. 2. Since we consider here the downlink, the receiver is located in the mobile terminal.

After baseband demodulation, the signal is sampled at the "chip" frequency and the samples belonging to the guard interval are eliminated. The signal thus obtained can be written:

$$R_g(t) = \sum_{k=1}^{K} d_k \cdot \sqrt{Pt_k} \cdot \sum_{l=1}^{L} h_g(l) \cdot c_k(l) \cdot \exp(j \cdot 2\pi f_l t) + b(t) \quad (3)$$

$$\text{for } nT \le t < (n+1)T$$

where t takes successive sampling time values, K is the number of users and $h_g(l)$ represents the response of the downlink channel of the user g to the frequency of the subcarrier l of the MC-CDMA symbol transmitted at time n·T and where b(t) is the received noise.

The samples obtained by sampling the demodulated signal at the "chip" frequency are serial to parallel converted in the serial to parallel converter $210_g$ before undergoing an FFT in the module $220_g$. The samples in the frequency domain, output from $220_g$, are despread by the spreading sequence of user g and equalised so as to compensate for the dispersive effects of the downlink transmission channel. To do this, the samples of the frequency domain are multiplied (by the multipliers $230_1{}^g, \ldots, 230_L{}^g$) on one hand with the coefficients $c_g{}^*(l)$ (where ·* is the conjugation operation) and on the other hand with equalising coefficients $q_g(l)$, $l=1,\ldots,L$. Several equalising methods are known from the prior art, among others:

MRC (Maximum Ratio Combining) equalisation according to which $q_l = h_l{}^*$

EGC (Equal Gain Combining) equalisation according to which $q_l = e^{-j\Phi_l}$ where $h_l = \rho_l e^{-j\Phi_l}$ ZF (Zero Forcing) equalisation where $q_l = h_l{}^{-1}$ MMSE (Minimum Mean Square Error) equalisation where $$q_l = \frac{h_l^*}{|h_l|^2 + \sigma^2}$$

and $\sigma^2$ is the noise variance on a carrier.

After multiplication, the samples are added in adder $240_g$ to output the resulting signal $r_g$:

$$r_g = \sum_{k=1}^{K} d_k \cdot \sqrt{Pt_k} \cdot \left( \sum_{l=1}^{L} h_g(l) q_g(l) \cdot c_k(l) \cdot c_g^*(l) \right) + \sum_{l=1}^{L} q_g(l) \cdot c_g^*(l) \cdot n_g(l) \quad (4)$$

which can be reformulated as:

$$r_g = d_g \cdot \sqrt{Pt_g} \left( \sum_{l=1}^{L} h_g(l) q_g(l) c_g(l) \cdot c_g^*(l) \right) + \quad (5)$$

$$\sum_{\substack{k=1 \\ k \neq g}}^{K} d_k \cdot \sqrt{Pt_k} \cdot \left( \sum_{l=1}^{L} h_g(l) q_g(l) \cdot c_k(l) \cdot c_g^*(l) \right) + \sum_{l=1}^{L} q_g(l) \cdot c_g^*(l) \cdot n_g(l)$$

where $n_g(l)$ are Gaussian noise samples relative to the different carriers.

The first term of expression (5) corresponds to the desired received signal dedicated to user g, the second term correspond to Multiple Access Interference (MAI) and the third term corresponds to residual noise. The Multiple Access Interference stems from the fact that a downlink channel carries the signals to a plurality of users.

The resulting signal $r_g$ is a decision variable which is detected in detector $250_g$ for supplying an estimated symbol $\hat{d}_g$. The detection implemented can be a hard or a soft detection (in the latter case detector $250_g$ can simply be omitted). Without loss of generality, it is assumed in the following that a soft detection is implemented and therefore that $\hat{d}_g = r_g$.

The capacity of a MC-CDMA system is basically limited by Multiple Access Interference. A possible way to combat MAI and consequently increase the system capacity is to use a spatial filtering technique to separate the links from or to different users. Spatial filtering is generally obtained by using antenna arrays for forming a plurality of beams in different directions. It has been recently proposed to use antenna arrays in MC-CDMA systems, in particular for transmission as disclosed in the article by M. Fujii entitled "Multibeam-time transmit diversity for OFDM-CDMA" published in Proc. of Globecom 2001, vol. 25, pp. 3095-3099 and in the article by C. K. Kim et al. entitled "Performance analysis of an MC-CDMA system with antenna array in a fading channel", published in IEICE Trans. Commun. Vol. E83-B, N°1, January 2000, pp. 84-92. However, when a user-specific spatial filtering technique is used for downlink transmission, in other words when a transmit beam is formed for each user at the base station, the frequency separation of the different users is not guaranteed anymore. In other words, although, on one hand, spatial filtering contributes to lower MAI by providing spatial separation of the transmission to the different users, it may, on the other hand, have a deleterious effect on the same MAI by destroying the separation of the users in the frequency domain.

SUMMARY OF THE INVENTION

It is a first object of the present invention to propose a new filtering technique for MC-CDMA downlink transmission which minimises the Multiple Access Interference for the different users of the system. Conversely, for a given MAI level, a second object of the present invention is to increase the capacity of a MC-CDMA system.

Furthermore, as described above in connection with FIG. 2, the receiving process performed at a mobile terminal (MT) of a MC-CDMA system is relatively complex since it involves in particular the determination of the equalising coefficients $q_g(l)$ and the step of equalisation itself. A simplification of the receiving process is therefore desirable all the more since the computation and power resources at the MT side are critically limited. A third object of the invention is to reduce the complexity of the receiving process at a mobile terminal without sacrificing the quality of service.

The above mentioned objects are attained by the transmitting method of the invention as defined in claim 1. Advantageous embodiments of the invention are defined in the appended dependent claims.

BRIEF DESCRIPTION OF THE DRAWINGS

The advantages and characteristics of the invention will emerge from a reading of the following description given in relation to the accompanying figures, amongst which.

DESCRIPTION OF EMBODIMENTS OF THE INVENTION

We refer back again to the context of a MC-CDMA system comprising a base station transmitting a plurality of symbols to a plurality K of active users $k=1,\ldots,K$ sharing the same carriers of an OFDM multiplex.

The basic idea underlying the invention is to use a filtering technique at the transmission side which is jointly optimised in space and frequency for all the active users. More specifically, if an array of M antennas is used at the base station, the signal transmitted to user k by antenna m can be expressed as:

$$S_k^m(t) = d_k \cdot \sqrt{Pt_k} \cdot \sum_{l=1}^{L} w_k^*(l,m) \cdot c_k(l) \exp(j \cdot 2\pi f_l t) \qquad (6)$$

where $w_k^*(l,m)$ is a complex weighting coefficient associated with the user k, the frequency component l, the antenna m and $\cdot^*$ denotes the conjugation operation. The components of the vector $w_k^*(l,m)$ can be grouped into a plurality of L spatial filtering vectors $w_k^*(l)$, l=1, . . . ,L, each vector $w_k^*(l)$ being used by the antenna array to form a transmit beam for the frequency component l of user k.

If we assume that the signals transmitted by the base station to the K users are synchronous, the signal transmitted to all the users by antenna m can be simply expressed as:

$$S^m(t) = \sum_{k=1}^{K} d_k \cdot \sqrt{Pt_k} \cdot \sum_{l=1}^{L} w_k^*(l,m) \cdot c_k(l) \exp(j \cdot 2\pi f_l t) \qquad (7)$$

Figure 3:
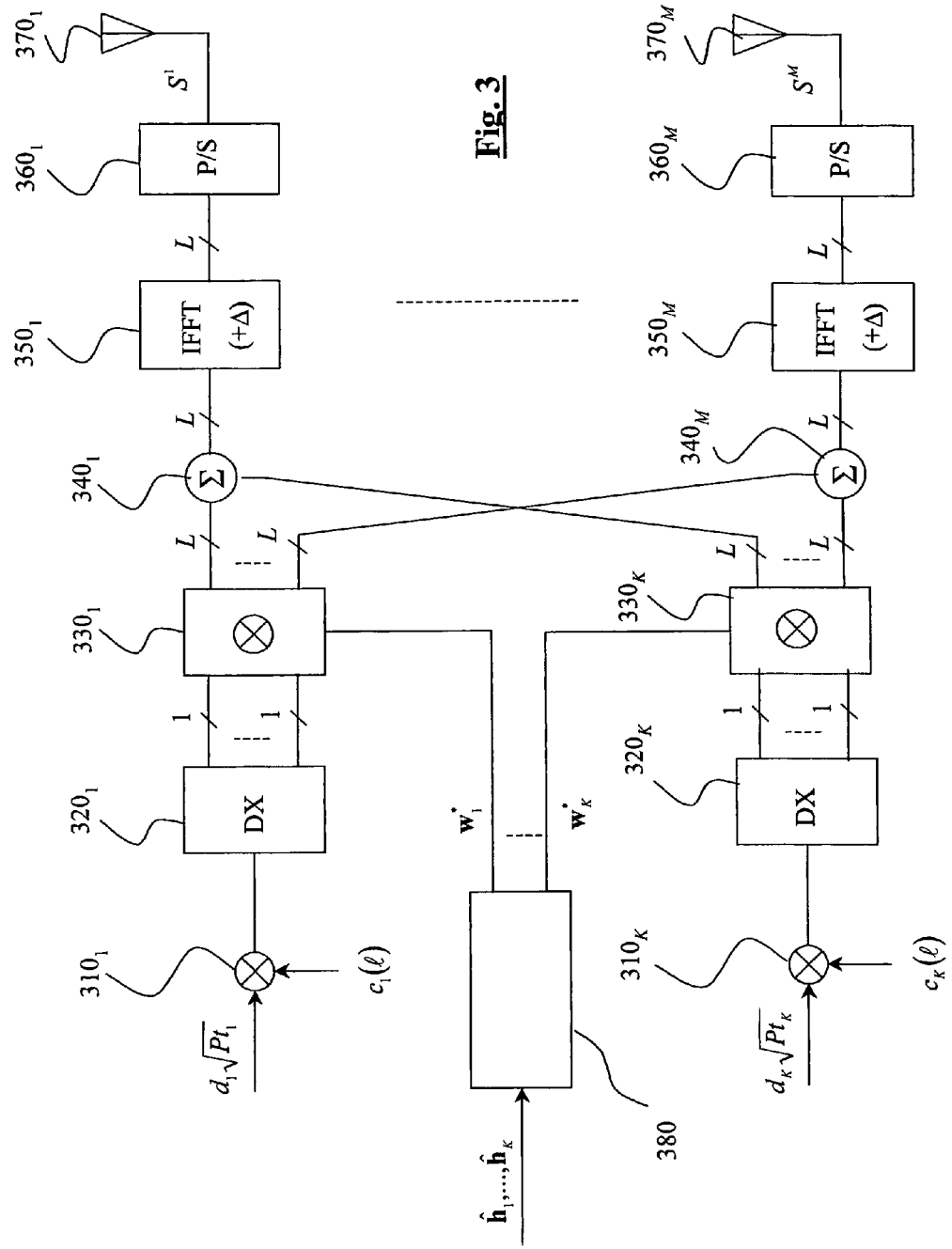
FIG. 3 depicts schematically the structure of an MC-CDMA transmitter according to the invention.

FIG. 3 illustrates schematically a MC-CDMA transmitter using the spatial filtering method according to the invention. The transmitter comprises K identical branches, each branch corresponding to a given active user. The branch dedicated to user k comprises a multiplier $310_k$, a demultiplexer $320_k$ and a parallel multiplier $330_k$ connected in series. For example, the branch dedicated to user 1 illustrated in the upper part of the Fig. comprises a multiplier $310_1$ for multiplying the complex value $\sqrt{Pt_1} \cdot d_1$ (it is recalled that $d_1$ is the symbol to be transmitted to user 1) with the spreading sequence $c_1(l)$, a demultiplexer $320_1$ for serial-to-parallel converting the spread complex values, a parallel multiplier $330_1$ for multiplying each of the spread complex values $\sqrt{Pt_1} \cdot d_1 \cdot c_1(l)$ with components of a complex weighting vector $w_1$ as defined further below. The result of the parallel multiplication in $330_1$ is represented by the M vectors $z_1^1, \ldots, z_1^M$ each vector $z_1^m$ being constituted of the frequency components of the signal to be transmitted by the antenna $370_m$. More specifically, $z_1^m$, m=1, . . . ,M is defined as a L-dimension vector $(z_1^m(1), \ldots, z_1^m(L))^T$ where $z_1^m(l) = \sqrt{Pt_1} \cdot d_1 \cdot c_1(l) \cdot w_1^*(l,m)$. Similarly, the output of the parallel multiplier $330_k$ of the $k^{th}$ branch is constituted of M vectors $z_k^1, \ldots, z_k^M$ the elements of which are given by $z_k^m(l) = \sqrt{Pt_k} \cdot d_k \cdot c_k(l) \cdot w_k^*(l,m)$.

For a given user k the complex weighting coefficients $w_k^*(l,m)$ are grouped into a vector $w_k$ of size M·L defined as $w_k^* = (w_k^*(\mathbf{1},\mathbf{1}), \ldots, w_k^*(L,\mathbf{1}), \ldots, w_k^*(\mathbf{1},M), \ldots, w_k^*(L,M))^T$, the first L elements of which corresponding to the weighting coefficients for antenna 1, user k and subcarriers 1 to L, the second L elements of which corresponding to the weighting coefficients for antenna 2, user k and subcarriers 1 to L, and so on. As the coefficients $w_k^*(l,m)$ are applied both in the space domain (for a given subcarrier l, they can be regarded as forming a beam for user k) and in the frequency domain (for a given antenna m, the coefficients $w_k^*(l,m)$ can be regarded as those of conventional frequency filter), the vector $w_k^*$ will be hereinafter referred to as the space-frequency transmit filtering (SFTF) vector associated to user k.

Figure 1:
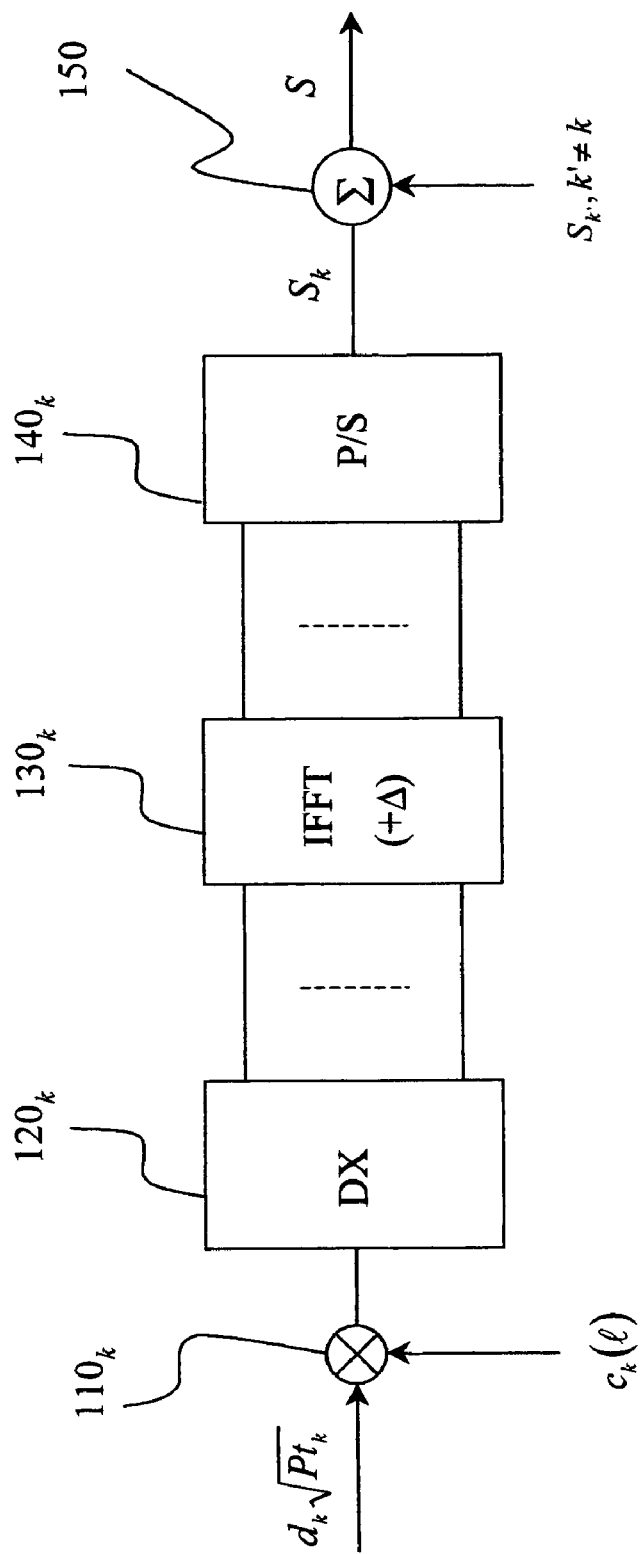
FIG. 1 depicts schematically the structure of an MC-CDMA transmitter known from the state of the art.

The MC-CDMA transmitter is further provided with a plurality M of adders $340_1, \ldots, 340_M$, each adder $340_m$ adding the signal vectors $z_1^m, \ldots, z_K^m$, m=1, . . . ,M output by the parallel multipliers $330_1, \ldots, 330_M$ and supplying the resulting vectors to the modules $350_1, \ldots, 350_M$ respectively. More precisely, each module $350_m$ (identical to the module $130_k$ in FIG. 1) performs an inverse Fast Fourier Transform on the vector of compound frequency components $$\left( \sum_{k=1}^{K} z_k^m(1), \ldots, \sum_{k=1}^{K} z_k^m(L) \right)^T$$

and adds a prefix ($\Delta$) to the MC-CDMA symbol thus obtained. After parallel-to-serial conversion in $360_1$ (and frequency up-conversion, not shown), the signal $S^m(t)$ carrying the MC-CDMA symbol is transmitted by the antenna $370_m$.

As described further below, the SFTF vectors $w_k^*$, k=1, . . . ,K, or equivalently the weighting coefficients $w_k^*(l,m)$, l=1, . . . ,L; m=1, . . . ,M are determined by a calculation module 380 from estimates of the coefficients of the downlink transmission channels and supplied to the parallel multipliers $330_1, \ldots, 330_K$. It is assumed in the following that the transmission is free from inter-carrier interference and inter-symbol interference (the latter, thanks to prefix insertion). In such instance, the downlink transmission channel between antenna m of the base station and the mobile terminal of user k can be characterised by a single multiplicative complex coefficient $h_k(l,m)$ (hereinafter called channel coefficient) for each subcarrier l. The coefficients $h_k(l,m)$ are assumed identical for the downlink and the uplink channels, assumption which is verified in practice when the MC-CDMA system operates in TDD (Time Division Duplex) mode. The estimates of the channel coefficients are hereinafter denoted $\hat{h}_k(l,m)$.

The channel coefficients $h_k(l,m)$ depend on the spatial signature of the downlink multipath channel and the fading coefficient of the channel. The spatial signature of the channel (supposed identical for downlink and uplink) is defined by the directions of transmission of the signal to user k or, equivalently by the direction of arrival (DOAs) of the signal transmitted by user k to the base station. It should be understood that the coefficients $h_k(l,m)$ for a given user k reflect not only the directivity pattern of the (transmit or receive) beam for this user at the various subcarrier frequencies but also the fading of the transmission channel at these frequencies.

Figure 2:
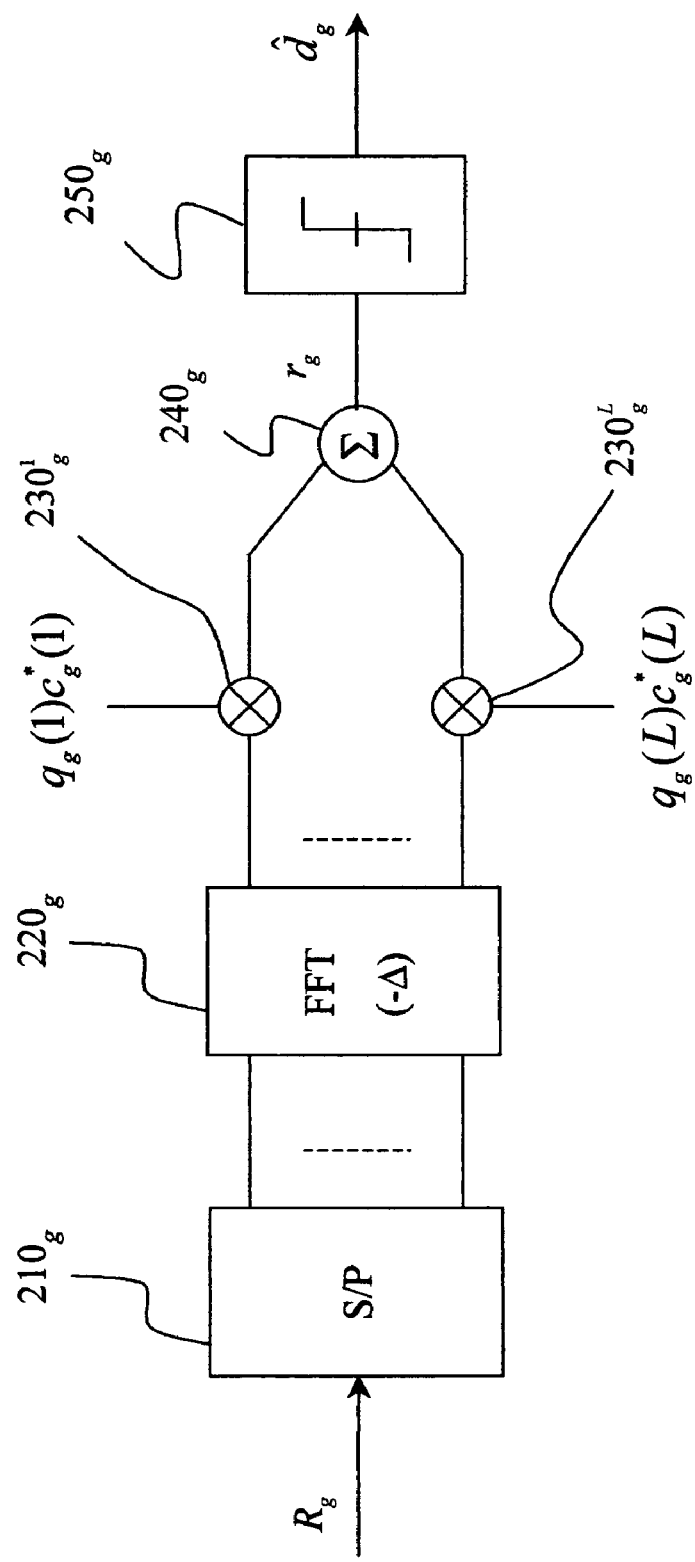
FIG. 2 depicts schematically the structure of an MC-CDMA receiver known from the state of the art.

If we now consider a mobile terminal of a given user g having the structure illustrated in FIG. 2 and receiving a signal transmitted by the MC-CDMA of FIG. 3, the decision variable can be expressed as, similar to (4):

$$\hat{d}_g = \sum_{k=1}^{K} d_k \cdot \sqrt{Pt_k} \cdot \sum_{m=1}^{M} \sum_{l=1}^{L} w_k^*(l,m) \cdot h_g(l,m) \cdot q_g(l) \cdot c_k(l) \cdot c_g^*(l) + \qquad (8)$$

$$\sum_{l=1}^{L} q_g(l) c_g^*(l) \cdot n_g(l)$$

which can be reformulated as follows:

$$\hat{d}_g = d_g \cdot \sqrt{Pt_g} \left( \sum_{m=1}^{M} \sum_{l=1}^{L} h_g(l,m) \cdot w_g^*(l,m) \cdot c_g(l) \cdot e_g^*(l) \right) + \qquad (9)$$

$$\sum_{m=1}^{M} \sum_{l=1}^{L} h_g(l,m) \cdot e_g^*(l) \cdot \left( \sum_{\substack{k=1 \\ k \neq g}}^{K} d_k \cdot \sqrt{Pt_k} \cdot w_k^*(l,m) \cdot c_k(l) \right) +$$

$$\sum_{l=1}^{L} e_g^*(l) \cdot n_g(l)$$

where $n_g(l)$ are Gaussian noise samples relative to the different carriers and $e_g(l) = q_g^*(l) c_g(l)$ where the coefficients $q_g(l)$ are not necessarily determined by one of the equalising methods recited above and can take any value. It should be noted that $e_g(l)$ are the conjugates of the coefficients combining the components carried by the different subcarriers at the output of the FFT module $220_g$. As it will be apparent to the man skilled in the art, the first term of expression (9) corresponds to the desired signal, the second term corresponds to the multiple access interference and the final term corresponds to the residual noise after despreading.

The expression (9) can be equivalently formulated in a more concise form:

$$\hat{d}_g = \tilde{e}_g^H \cdot (h_g \circ w_g^* \circ \tilde{c}_g) \cdot d_g \cdot \sqrt{Pt_g} + \qquad (10)$$

$$\tilde{e}_g^H \cdot \left( h_g \circ \left( \sum_{\substack{k=1 \\ k \neq g}}^{K} (w_k^* \circ \tilde{c}_k) \cdot d_k \cdot \sqrt{Pt_k} \right) \right) + e_g^H \cdot n_g$$

where the boldface letters represent vectors and:

$\tilde{c}_k$ is a vector of size M·L defined as $\tilde{c}_k = (c_k^T, c_k^T, \ldots, c_k^T)^T$ i.e. is the concatenation of M times the vector $c_k = (c_k(1), \ldots, c_k(L))^T$ representing the spreading sequence for user k;

$\tilde{e}_g$ is a vector of size M·L defined as $\tilde{e}_g = (e_g^T, e_g^T, \ldots, e_g^T)^T$ i.e. is the concatenation of M times the vector $e_g = (e_g(1), \ldots, e_g(L))^T$, or, equivalently, $\tilde{e}_g = \tilde{c}_g \circ \tilde{q}_g$ where $\tilde{q}_g = (q_g^T, q_g^T, \ldots, q_g^T)^T$ is the concatenation of M times the vector $q_g = (q_g(1), \ldots, q_g(L))^T$.

$h_g$ is a vector of size M·L defined as $h_g = (h_g(1,1), \ldots, h_g(L,1), \ldots, h_g(1,M), \ldots, h_g(L,M))^T$ the first L elements of which corresponding to the channel between antenna 1 and user g, the second L elements of which corresponding to the channel between antenna 2 and user g and so on;

$w_k^*$ is the SFTF vector relative to user k as defined above;

$e_g$ and $n_g$ are respectively defined as $e_g = (e_g(1), \ldots, e_g(L))^T$ and $n_g = (n_g(1), \ldots, n_g(L))^T$;

$(\cdot)^H$ denotes the hermitian transpose operator, u.v denotes the scalar product of vectors u and v, u∘v denotes the element wise product of vectors u and v, i.e. the $i^{th}$ element of vector u∘v is the product of the $i^{th}$ element of vector u and the $i^{th}$ element of vector v.

According to a first advantageous aspect of the invention, for a given user g, a set of weighting coefficients $w_g^*(l,m)$, $l=1, \ldots, L$; $m=1, \ldots, M$ (or equivalently a SFTF vector $w_g^*$) is determined to ensure a minimisation of the MAI affecting the user in question, taking into account the global effect resulting from the MAI reduction induced by the separation of the active users in the space domain and the MAI increase induced by the loss of orthogonality in the frequency domain.

According to a second advantageous aspect of the invention, there is performed a joint MAI minisation criterion taking into account all the active users. More precisely, the proposed minimisation criterion is not aimed at merely minimising the MAI affecting the reception of a given active user irrespective of the MAI affecting the reception of the other active users but takes also into account the MAIs affecting the latter users induced by the signal transmitted to the user in question.

According to a third advantageous aspect of the invention, there is used a MAI minimisation criterion taking into account the transmit power constraint of the MC-CDMA transmitter, which is itself inherently limited by the total transmit power of the base station.

In order to explain in further detail the transmission method according to the invention, we consider first a criterion based on the maximisation of the signal to interference plus noise ratio (SINR) relative to a given active user g, under the constraint of a fixed transmit power level for this user.

The signal to interference plus noise ratio relative to the user g can be expressed as:

$$SINR_g = \frac{P_g}{MAI_g + \sigma^2} \qquad (11)$$

where $P_g$ is the power of the desired signal received by user g, $MAI_g$ is the MAI level affecting the desired signal and $\sigma^2$ is variance of the residual noise after despreading.

From the first term of (10) and assuming that the average power of the symbols $d_g$ is unity, the power of the desired signal received by user g can be expressed as:

$$P_g = Pt_g \cdot |w_g^H \cdot (\tilde{e}_g^* \circ h_g \circ \tilde{c}_g)|^2 \qquad (12)$$

From the second term of (10) and assuming that the average power of the symbols $d_k$ is unity, the multiple access interference level $MAI_g$ can be expressed as:

$$MAI_g = \sum_{\substack{k=1 \\ k \neq g}}^{K} Pt_k \cdot p_{MAI}(k \to g) \qquad (13)$$

where $p_{MAI}(k \to g)$ reflects the normalised contribution of (the signal transmitted to) user k to the MAI affecting user g and is defined as:

$$p_{MAI}(k \to g) = w_k^H v_{gk} v_{gk}^H w_k \qquad (14)$$

where $v_{gk} = \tilde{e}_g^* \circ h_g \circ \tilde{c}_k = \tilde{c}_g^* \circ \tilde{q}_g \circ h_g \circ \tilde{c}_k$.

From (12), (13) and (14), the signal to interference plus noise ratio relative to user g can be rewritten:

$$SINR_g = \frac{Pt_g |w_g^H \cdot (\tilde{e}_g^* \circ h_g \circ \tilde{c}_g)|^2}{\sum_{\substack{k=1 \\ k \neq g}}^{K} Pt_k \cdot w_k^H v_{gk} v_{gk}^H w_k + \sigma^2} \qquad (15)$$

As it is apparent from (15), the expression of $SINR_g$ does not depend only upon the weighting coefficients $w_g^*(l,m)$ relative to user g (i.e. the SFTF vector $w_g^*$ relative to user g) but also upon the weighting coefficients relative to the other users $k \neq g$ (i.e the SFTF vectors $w_k^*$ relative to the users $k \neq g$). This can be attributed to the fact that the MAI affecting user g is influenced by the distribution in space and frequency of the signals transmitted to the other users $k \neq g$. In other words, a change of the SFTF vector relative to a given user modifies the SINRs of all the other active users. It follows that the problem of finding the SFTF vector $w_g^*$ maximising the $SINR_g$ cannot be solved independently of the problem of finding the other SFTF vector $w_k^*$ maximising the values $SINR_k$ for $k \neq g$. However, finding the set of the SFTF vectors $w_k^*$ maximising simultaneously all the values $SINR_k$ is a very complex if not intractable task.

According to the invention, the problem of maximising the $SINR_g$ is elegantly solved by observing that in practice the channel response vectors $h_k$, $k=1, \ldots, K$ have the same statistical properties and that consequently for two given users k and k' the normalised interference contributions $p_{MAI}(k \to k')$ and $p_{MAI}(k' \to k)$ can be considered equal, which is especially justified when the same method of space-time filtering is applied to all the users.

More precisely, there is proposed a criterion based upon a pseudo signal to noise plus interference ratio denoted $SINR_g^m$ and defined as follows:

$$SINR_g^m = \frac{P_g}{MAI_g^m + \sigma^2} \text{ where} \quad (16)$$

$$MAI_g^m = \sum_{\substack{k=1 \\ k \neq g}}^{K} Pt_k \cdot p_{MAI}(g \to k) \text{ with}$$

$$p_{MAI}(g \to k) = w_g^H v_{kg} v_{kg}^H w_g, \text{ that is:}$$

$$MAI_g^m = w_g^H \left( \sum_{\substack{k=1 \\ k \neq g}}^{K} Pt_k \cdot v_{kg} v_{kg}^H \right) w_g = w_g^H \Phi_g w_g$$

where $\Phi_g$ is the quadratic matrix defined as:

$$\Phi_g = \sum_{\substack{k=1 \\ k \neq g}}^{K} Pt_k \cdot v_{kg} v_{kg}^H.$$

The pseudo signal to noise plus interference ratio can therefore be reformulated as:

$$SINR_g^m = \frac{Pt_g |w_g^H \cdot (\tilde{e}_g^* \circ h_g \circ \tilde{c}_g)|^2}{w_g^H \Phi_g w_g + \sigma^2} \quad (17)$$

For a fixed predetermined transmit power value $Pt_g$, the constraint on the transmit power for user g can be expressed as a constraint on the module of the SFTF vector $w_g$, namely $w_g^H \cdot w_g = 1$.

From (17), the maximisation of $SINR_g^m$ under the constraint of a fixed transmit power is equivalent to find:

$$\arg\max = \frac{Pt_g |w_g^H \cdot (\tilde{e}_g^* \circ h_g \circ \tilde{c}_g)|^2}{w_g^H (\Phi_g + \sigma^2 I_{ML}) w_g} \quad (18)$$

under the constraint $w_g^H \cdot w_g = 1$, where $I_{ML}$ is the identity matrix of size $M \cdot L \times M \cdot L$.

It should be noted that expression (18) depends only on the SFTF vector $w_g$ and is invariant by multiplication of $w_g$ with a constant. Defining $\check{w}_g = \beta w_g$, where $\beta$ is a scalar, it is there possible to look for the optimal vector $\check{w}_g$ that verifies $\check{w}_g^H (\tilde{e}_g^* \circ h_g \circ \tilde{c}_g) = 1$, and then to normalise the result by the factor $$\frac{1}{\|\check{w}_g\|}$$

in order to obtain $w_g$. The optimum pre-distortion vector SFTF $\check{w}_g$ must therefore satisfy:

$$\arg\min(\check{w}_g^H \Psi_g \check{w}_g) \text{ with } \Psi_g = \Phi_g + \sigma^2 \cdot I_{ML} \text{ and } \check{w}_g^H (\tilde{e}_g^* \circ h_g \circ \tilde{c}_g) = 1 \quad (19)$$

For solving this problem, we introduce the Lagrange function:

$$L = \check{w}_g^H \Psi_g \check{w}_g - \lambda (\check{w}_g^H f_g - 1) \text{ with } f_g = \tilde{e}_g^* \circ h_g \circ \tilde{c}_g \quad (20)$$

where $\lambda$ is a Lagrange multiplier.

By calculating the gradient according to the vectors $\check{w}_g^*$ (the same result can be obtained by calculating the gradient according to the vector $\check{w}_g$):

$$\nabla_{\check{w}_g^*} L = \Psi_g \check{w}_g - \lambda f_g = 0 \quad (21)$$

Finally, we can conclude that the optimal SFTF vector $\check{w}_g$ is given by:

$$\check{w}_g = \lambda (\Phi_g + \sigma^2 \cdot I_{ML})^{-1} f_g = \lambda (\Phi_g + \sigma^2 \cdot I_{ML})^{-1} (\tilde{e}_g^* \circ h_g \circ \tilde{c}_g) \quad (22)$$

The SFTF vector $w_g$ can be obtained from $\check{w}_g$:

$$w_g = \mu_g (\Phi_g + \sigma^2 \cdot I_{ML})^{-1} (\tilde{e}_g^* \circ \tilde{q}_g \circ h_g \circ \tilde{c}_g) \quad (23)$$

where the coefficient $\mu_g$ is given by the constraint upon the transmit power for user g, namely is chosen so that $w_g^H \cdot w_g = 1$.

In practice, the downlink channel coefficients $h_g(e, m)$ constituting the vector $h_g$ are assumed identical to the corresponding uplink channel coefficients, which are in turn estimated from pilot symbols transmitted from the active users to the base station.

Turning back to FIG. 3 and denoting $\hat{h}_k$ the vector of the estimates $\hat{h}_k(l, m)$, the calculation module 380 determines for each active user k the SFTF vector $w_k^*$ from:

$$w_k = \mu_k (\hat{\Phi}_k + \sigma^2 \cdot I_{ML})^{-1} (\tilde{c}_k^* \circ \tilde{q}_k \circ \hat{h}_k \circ \tilde{c}_k) \quad (24)$$

where the coefficient $\mu_k$ is given by the constraint upon the transmit power for user k (i.e. $w_k^H \cdot w_k = 1$) and $$\hat{\Phi}_k = \sum_{\substack{k'=1 \\ k' \neq k}}^{K} Pt_{k'} \hat{v}_{k'k} \hat{v}_{k'k}^H \text{ with } v_{k'k} = \tilde{c}_{k'}^* \circ \tilde{q}_{k'} \circ \hat{h}_{k'} \circ \tilde{c}_k \quad (25)$$

According to first embodiment of the invention, the SFTF vector $w_g^*$ for a given user g is determined by the calculation module 380 from:

$$w_g = \mu_g (\hat{\Phi}_g + \sigma^2 \cdot I_{ML})^{-1} (\tilde{c}_g^* \circ \hat{h}_g \circ \tilde{c}_g) \quad (26)$$

which can be further simplified if the spreading sequences are such that $c_g(l) \cdot c_g^*(l) = 1$ for $l=1, \ldots, L$ e.g. if Walsh-Hadamard spreading sequences ($c_g(l) \in \{-1, 1\}$) are used:

$$w_g = \mu_g (\hat{\Phi}_g + \sigma^2 \cdot I_{ML})^{-1} \hat{h}_g \quad (27)$$

Figure 4:
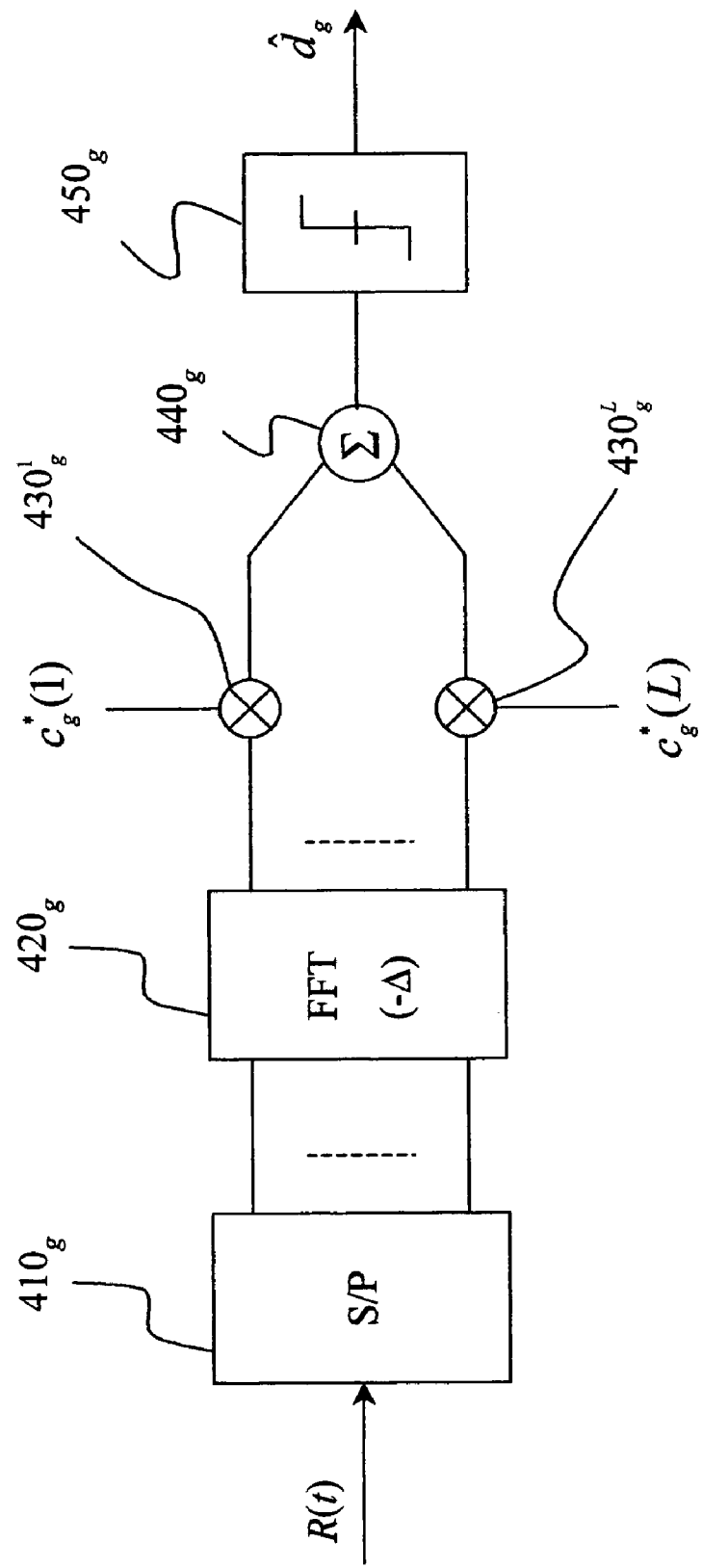
FIG. 4 depicts schematically the structure of a first MC-CDMA receiver to be used with the MC-CDMA transmitter according to a first embodiment of the invention.

In such instance, the receiving process carried out at the mobile terminals can be drastically simplified as shown in FIG. 4. The MC-CDMA receiver for a user g is schematically represented in FIG. 4 and comprises modules $410_g$ and $450_g$ identical to the corresponding modules $210_g$ to $250_g$ of FIG. 2. However, in contrast with the MC-CDMA receiver of the prior art (FIG. 2), a simple despreading is effected at the output of the FFT module $420_g$ and no equalisation is required anymore. In particular, an estimation of the downlink channel coefficients is not needed at the receiver side, thus relieving the mobile terminal of the computation burden associated therewith.

It should be appreciated that the filtering in the frequency domain performed at the transmission side by the weighting coefficients of SFTF vector $w_g^*$ fully or almost fully pre-compensates for the fading on the carriers of the downlink transmission channel.

According to a second embodiment of the invention, the downlink channel coefficients $h_g(l,m)$ are coarsely estimated by the MC-CDMA transmitter and a complementary equalisation is performed at the receiving side.

This is for example the case if the estimates of the uplink channel coefficients (from which the latter are derived) are updated at a rate lower than the actual variation thereof More specifically, denoting $\hat{h}_g^C$ the vector representing the coarse estimates of the channel coefficients for a given user g, the MC-CDMA transmitter would apply a SFTF filtering based on:

$$w_g = \mu_g (\hat{\Phi}_g + \sigma^2 I_{ML})^{-1} (\tilde{c}_g^* \circ \hat{h}_g^C \circ \tilde{c}_g) \quad (28)$$

and a set of equalising coefficients $q_g^f(l)$, $l=1, \ldots L$ would finely compensate for the residual frequency distortion at the receiving side.

In a further variant, the vector of coarse estimates, $\hat{h}_g^C$, used for determining $w_g^*$ in the calculation module 380, is derived from the spatial signature of user g. More specifically, it is assumed that the channel coefficients $h_g(l,m)$ can be decomposed into:

$$h_g(l,m) = \bar{h}_g(l,m) \cdot \eta_g(l) \quad (29)$$

where $\bar{h}_g(l,m)$ accounts for the spatial signature of user g (varying relatively slowly in time) and $\eta_g(l)$ accounts for the frequency fading of the channel. The MC-CDMA transmitter estimates the coefficients $\bar{h}_g(l,m)$ from the DOAs of the signal received by the antenna array from user g and uses these estimates $\bar{h}_g(l,m)$ as elements of the vector $\hat{h}_g^C$.

Figure 5:
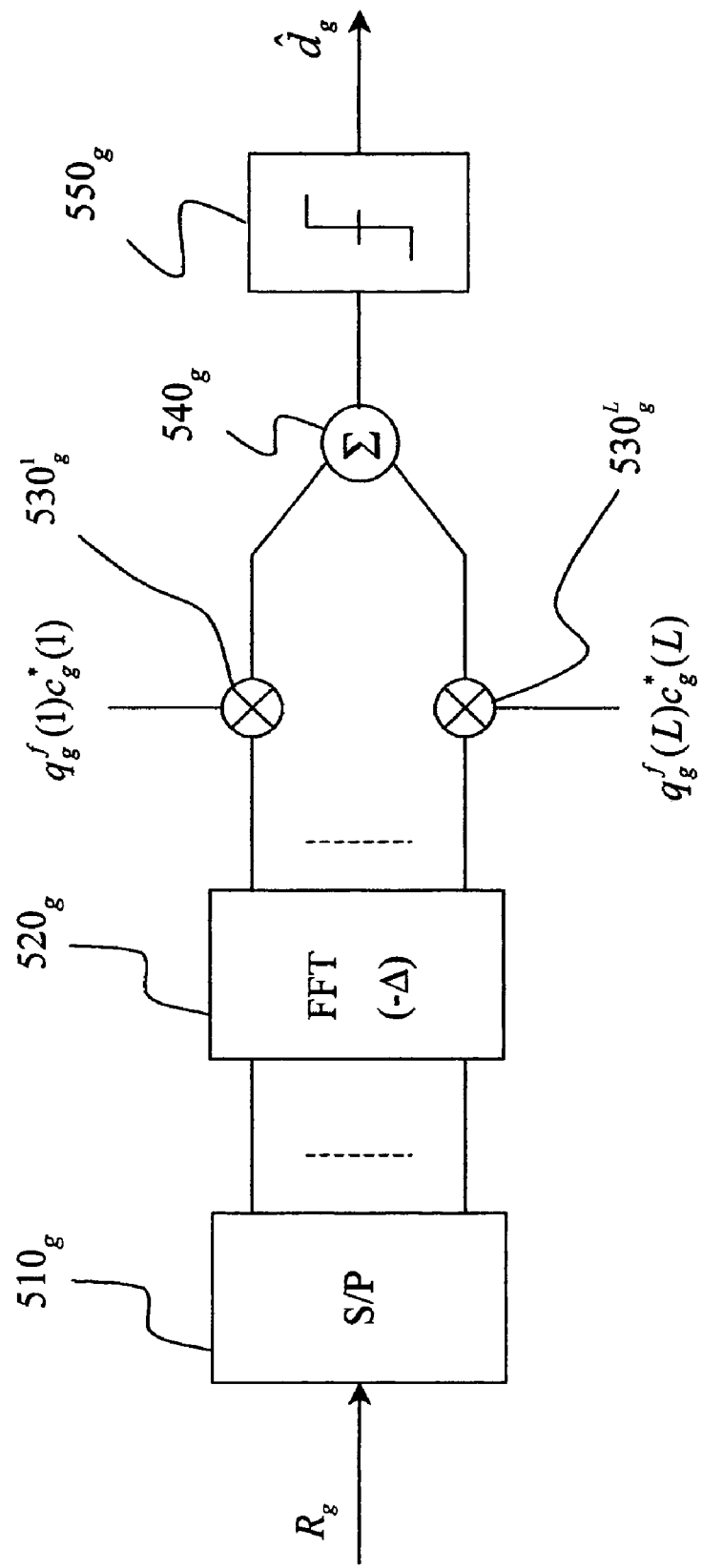
FIG. 5 depicts schematically the structure of a second MC-CDMA receiver to be used with the MC-CDMA transmitter according to a second embodiment of the invention.

FIG. 5 shows schematically a receiver for use with a MC-CDMA transmitter according to the latter variant. The modules $510_g$ to $550_g$ are identical to the corresponding modules $210_g$ to $250_g$ of FIG. 2 and the compensation for the fast fading factors $\eta_g(l)$ is ensured here by equalising coefficients $q_g^f(l)$, $l=1, \ldots L$ derived from $\eta_g(l)$ according to one of the known types of equalisation method.

A further advantageous aspect of the invention lies in the possibility of increasing the capacity of a MC-CDMA system. It is reminded that the capacity of a conventional MC-CDMA system is limited by the number of available spreading codes (or spreading sequences), which is equal to the number L of subcarriers when the codes are chosen orthogonal. The user separation in the space domain provided by the transmission method according to the invention allows to reuse the same spreading codes for different users. More specifically, a spreading code $c_k(l)$, $l=1, \ldots, L$ already allocated to a user k can be also reallocated to a user k' provided users k and k' have substantially different spatial signatures.

According to a first possible allocation scheme, if the number of active users happens to exceed the number L of available spreading codes (for example, if the available spreading codes are already allocated and if an incoming call is requested), the spreading codes are reallocated e.g. in the natural order $c_1, c_2, \ldots$, so that two users k and k+L share the same spreading code $c_k$. In order to reduce the interference occurring when users k and k+L exhibit similar spatial signatures, it is further proposed to apply random scrambling codes on top of the available spreading codes. More specifically, if a symbol has to be transmitted to a user k belonging to a given set $\Omega_p$, where $p \in \{1, \ldots, P\}$, it is multiplied by the following sequence:

$$c_k^{ext}(l) = c_{k[L]}(l) \cdot m_p(l), \, l=1, \ldots L \quad (30)$$

where user index k may be greater than L, p denotes the integer part of the division k/L and k[L] denotes the rest thereof, $c_k^{ext}(l)$, $l=1, \ldots, L$ stands for a spreading sequence belonging to an extended set (of cardinal L·P) and $m_p(l)$, $l=1, \ldots, L$ is a random scrambling code.

Since users belonging to a given set $\Omega_p$ are subjected to the same scrambling code, their respective spreading sequences (as defined in (30)) are orthogonal and, consequently, these users are spatially and frequency separated by the transmission method according to the invention. In contrast, orthogonality is not maintained between spreading sequences allocated to users belonging to different sets. However, the latter users still benefit from the spatial separation provided by said transmission method as well as from the interference reduction due to the random scrambling .

Although the MC-CDMA transmitter illustrated in FIG. 3 has been described in terms of functional modules e.g. computing or estimating means, it will be appreciated by the man skilled in the art that all or part of this device can be implemented by means of a single processor either dedicated for performing all the functions depicted or in the form of a plurality of processors either dedicated or programmed for each performing one or some of said functions.

The invention claimed is:

1. A transmission method, comprising:
    transmitting a plurality of symbols from a base station of a MC-CDMA telecommunication system to a plurality (K) of users, said base station including a plurality (M) of antenna elements;
    spreading each symbol ($d_k$) to be transmitted to the plurality of users being with a coding sequence ($c_k(l)$) over a plurality (L) of carriers (l) to produce a plurality of corresponding frequency components; and
    weighting, at the base station, each frequency component produced by a symbol of a user (k) by a plurality (M) of weighting complex coefficients ($w_k^*(l,m)$, $m=1, \ldots, M$) to obtain a plurality (LM) of weighted frequency components ($z_k^m(l)$), each weighting coefficient being relative to a user (k), a carrier (l) and an antenna element (m), said plurality of weighting coefficients being determined from estimates of channel coefficients ($h_k(l,m)$) of downlink transmission channels between each antenna element and each user for each carrier frequency.

2. The transmission method according to claim 1, further comprising:
    adding up per carrier, for each antenna element (m), the weighted frequency components relative to said antenna element and to the plurality of users;
    outputting a plurality (L) of compound frequency components $$\left(\sum_{k=1}^{k} Z_{kz}^{m}(l), l = 1, \cdots, L\right);$$

and inverse Fourier transforming said plurality of compound frequency components to generate a signal ($S^m(t)$) to be transmitted by said antenna element.

3. The transmission method according to claims 1 or 2, wherein said estimates of the channel coefficients are obtained as estimates of the channel coefficients of uplink transmission channels between each user and each antenna element for each carrier frequency.

4. The transmission method according to claim 3, further comprising:

obtaining the weighting coefficients relative to a given user as a function of coding sequences of all said users, said estimates of channel coefficients, transmit powers ($Pt_k$) used for respectively transmitting said symbols to the different users, a variance of noise ($\sigma^2$) affecting the received frequency components at the user side and equalizing coefficients applied to the weighting coefficients.

5. A transmission method, comprising:

transmitting a plurality of symbols from a base station of a MC-CDMA telecommunication system to a plurality (K) of users, said base station including a plurality (M) of antenna elements;

spreading each symbol ($d_k$) to be transmitted to the plurality of users with a coding sequence ($c_k(l)$) over a plurality (L) of carriers (l) to produce a plurality of corresponding frequency components; and weighting each frequency component produced by a symbol of a user (k) by a plurality (M) of weighting complex coefficients ($w_k^*(l,m), m=1, \ldots, M$) to obtain a plurality (LM) of weighted frequency components ($z_k^m(l)$), each weighting coefficient being relative to a user (k), a carrier (l) and an antenna element (m), said plurality of weighting coefficients being determined from estimates of channel coefficients ($h_k(l,m)$) of downlink transmission channels between each antenna element and each user for each carrier frequency, wherein said estimates of the channel coefficients are obtained as estimates of the channel coefficients of uplink transmission channels between each user and each antenna element for each carrier frequency;

obtaining the weighting coefficients relative to a given user as a function of coding sequences of all said users, said estimates of channel coefficients, transmit powers ($Pt_k$) used for respectively transmitting said symbols to the different users, a variance of noise ($\sigma^2$) affecting received frequency components at a user side and equalizing coefficients applied to the weighting coefficients, wherein the weighting coefficients relative to a given user g are determined from elements of a vector $w_g^*$, where * denotes a conjugate operation and where $w_g$ is determined according to an expression of:

$$w_g = \mu_g (\hat{\Phi}_g + \sigma^2 \cdot I_{ML})^{-1} (\tilde{c}_g \circ \tilde{q}_g \circ \tilde{h}_g \circ \tilde{c}_g)$$

where, M and L are respectively a number of the antenna elements and a number of the carriers;

$\tilde{c}_g$ is a vector of size M·L defined as a concatenation of M times a vector $c_g = (c_g(1), \ldots, c_g(L))^T$ representing a coding sequence of said given user g;

$\tilde{q}_g$ is a vector of size M·L defined as the concatenation of M times a vector $q_g = (q_g(1), \ldots, q_g(L))^T$ representing equalizing coefficients for said given user g;

$\tilde{h}_g$ is a vector of size M·L the first L elements of which represent estimates of a channel between antenna element 1 and user g, second L elements of which correspond to estimates of a channel between antenna element 2 and user g and so on;

$\mu_g$ is a scalar coefficient given by a constraint upon a transmit power for user g;

$I_{ML}$ is an identity matrix of size M·L×M·L;

$\sigma^2$ is a value of said noise variance;

$\hat{\Phi}_g$ is a hermitian matrix characterising multiple access interference generated by the user g on other users; and ∘ denotes element by element multiplication of two vectors.

6. The transmission method according to claim 5, wherein said hermitian matrix is obtained from an expression of:

$$\hat{\Phi}_g = \sum_{k \neq g}^{k} Pt_k \cdot \hat{v}_{kg} \hat{v}_{kg}^H$$

where K is number of users, $Pt_k$ is a transmit power for user k and $$\hat{v}_{kg} = \tilde{c}_k^* \circ \tilde{q}_k \circ \tilde{h}_k \circ \tilde{c}_g$$

where $\tilde{c}_k$ is a vector of size M·L defined as a concatenation of M times a vector $c_k = (c_k(1), \ldots, c_k(L))^T$ representing a coding sequence of user k;

$\tilde{q}_k$ is a vector of size M·L defined as a concatenation of M times a vector $q_k = (q_k(1), \ldots, q_k(L))^T$ representing equalizing coefficients for user k; and $\tilde{h}_k$ is a vector of size M·L, first L elements of which represent estimates of a channel between antenna element 1 and user k, second L elements of which correspond to estimates of a channel between antenna element 2 and user k and so on.

7. A transmission method, comprising:

transmitting a plurality of symbols from a base station of a MC-CDMA telecommunication system to a plurality (K) of users, said base station including a plurality (M) of antenna elements;

spreading each symbol ($d_k$) to be transmitted to the plurality of users with a coding sequence ($c_k(l)$) over a plurality (L) of carriers (l) to produce a plurality of corresponding frequency components; and weighting each frequency component produced by a symbol of a user (k) by a plurality (M) of weighting complex coefficients ($w_k^*(l,m), m=1, \ldots, M$) to obtain a plurality (LM) of weighted frequency components ($z_k^m(l)$), each weighting coefficient being relative to a user (k), a carrier (l) and an antenna element (m), said plurality of weighting coefficients being determined from estimates of channel coefficients ($h_k(l,m)$) of downlink transmission channels between each antenna element and each user for each carrier frequency, wherein said estimates of the channel coefficients are obtained as estimates of the channel coefficients of uplink transmission channels between each user and each antenna element for each carrier frequency;

obtaining the weighting coefficients relative to a given user as a function of coding sequences of all said users, said estimates of channel coefficients, transmit powers ($Pt_k$) used for respectively transmitting said symbols to the different users, a variance of noise ($\sigma^2$) affecting received frequency components at a user side and equalizing coefficients applied to the weighting coefficients, wherein the weighting coefficients relative to a given user g are determined from elements of a vector $w_g^*$ where * denotes a conjugate operation and where $w_g$ is determined according to an expression of:

$$w_g = \mu_g (\hat{\Phi}_g + \sigma^2 \cdot I_{ML})^{-1} (\tilde{c}_g \circ \hbar_g \circ \tilde{c}_g)$$

where, M and L are respectively a number of the antenna elements and a number of the carriers;

$\tilde{c}_g$ is a vector of size M·L defined as a concatenation of M times a vector $c_g(c_g(1), \ldots, c_g(L))^T$ representing a coding sequence of said given user g;

$\hbar_g$ is a vector of size M·L, first L elements of which represent estimates of a channel between antenna element 1 and user g, second L elements of which correspond to estimates of a channel between antenna element 2 and user g and so on;

$\mu_g$ is a scalar coefficient given by a constraint upon a transmit power for user g;

$L_{ML}$ is an identity matrix of size M·L×M·L;

$\sigma^2$ is a value of said noise variance;

$\hat{\Phi}_g$ is a hermitian matrix characterizing a multiple access interference generated by user g on other users; and $\circ$ denotes element by element multiplication of two vectors.

8. A transmission method, comprising:

transmitting a plurality of symbols from a base station of a MC-CDMA telecommunication system to a plurality (K) of users, said base station including a plurality (M) of antenna elements:

spreading each symbol ($d_k$) to be transmitted to the plurality of users with a coding sequence ($c_k(l)$) over a plurality (L) of carriers (l) to produce a plurality of corresponding frequency components; and weighting each frequency component produced by a symbol of a user (k) by a plurality (M) of weighting complex coefficients ($w_k^*(l,m), m=1, \ldots, M$) to obtain a plurality (LM) of weighted frequency components ($z_k^m(l)$), each weighting coefficient being relative to a user (k), a carrier (l) and an antenna element (m), said plurality of weighting coefficients being determined from estimates of channel coefficients ($h_k(l,m)$) of downlink transmission channels between each antenna element and each user for each carrier frequency, wherein said estimates of the channel coefficients are obtained as estimates of the channel coefficients of uplink transmission channels between each user and each antenna element for each carrier frequency;

obtaining the weighting coefficients relative to a given user as a function of coding sequences of all said users, said estimates of channel coefficients, transmit powers ($Pt_k$) used for respectively transmitting said symbols to the different users, a variance of noise ($\sigma^2$) affecting received frequency components at a user side and equalizing coefficients applied to the weighting coefficients, wherein the weighting coefficients relative to a given user g are determined from elements of a vector $w_g^*$ where * denotes a conjugate operation and $w_g$ is determined according to an expression of:

$$w_g = \mu_g (\hat{\Phi}_g + \sigma^2 \cdot I_{ML})^{-1} (\hbar_g)$$

where, M and L are respectively a number of the antenna elements and a number of the carriers;

$\hbar_g$ is a vector of size M·L, first L elements of which represent estimates of a channel between antenna element 1 and user g, second L elements of which corresponding to estimates of a channel between antenna element 2 and user g and so on;

$\mu_g$ is a scalar coefficient given by a constraint upon a transmit power for user g;

$L_{ML}$ is an identity matrix of size M·L×M·L;

$\sigma^2$ is a value of said noise variance; and $\Phi_g$ is a hermitian matrix characterizing multiple access interference generated by user g on other users.

9. The transmission method according to claims 7 or 8, wherein said hermitian matrix is obtained from an expression of:

$$\hat{\Phi}_g = \sum_{k \neq g}^{k} Pt_k \cdot \hat{v}_{kg} \hat{v}_{kg}^H$$

where K is number of users, $Pt_k$ is a transmit power for user k and $$\hat{v}_{kg} = \tilde{c}_k^* \circ \hbar_k \circ \tilde{c}_g$$

where $\tilde{c}_k$ is a vector of size M·L defined as a concatenation of M times a vector $c_k = (c_k(1), \ldots, c_k(L))^T$ representing a coding sequence of user k, $\tilde{c}_g$ is a vector of size M·L defined as a concatenation of M times a vector $c_g = (c_g(1), \ldots, c_g(L))^T$ representing a coding sequence of said given user g;

$\hbar_k$ is a vector of size M·L, first L elements of which represent estimates of a channel between antenna element 1 and user k, second L elements of which correspond to estimates of a channel between antenna element 2 and user k and so on; and $\circ$ denotes the element by element multiplication of two vectors.

* * * * *